Figure 4:
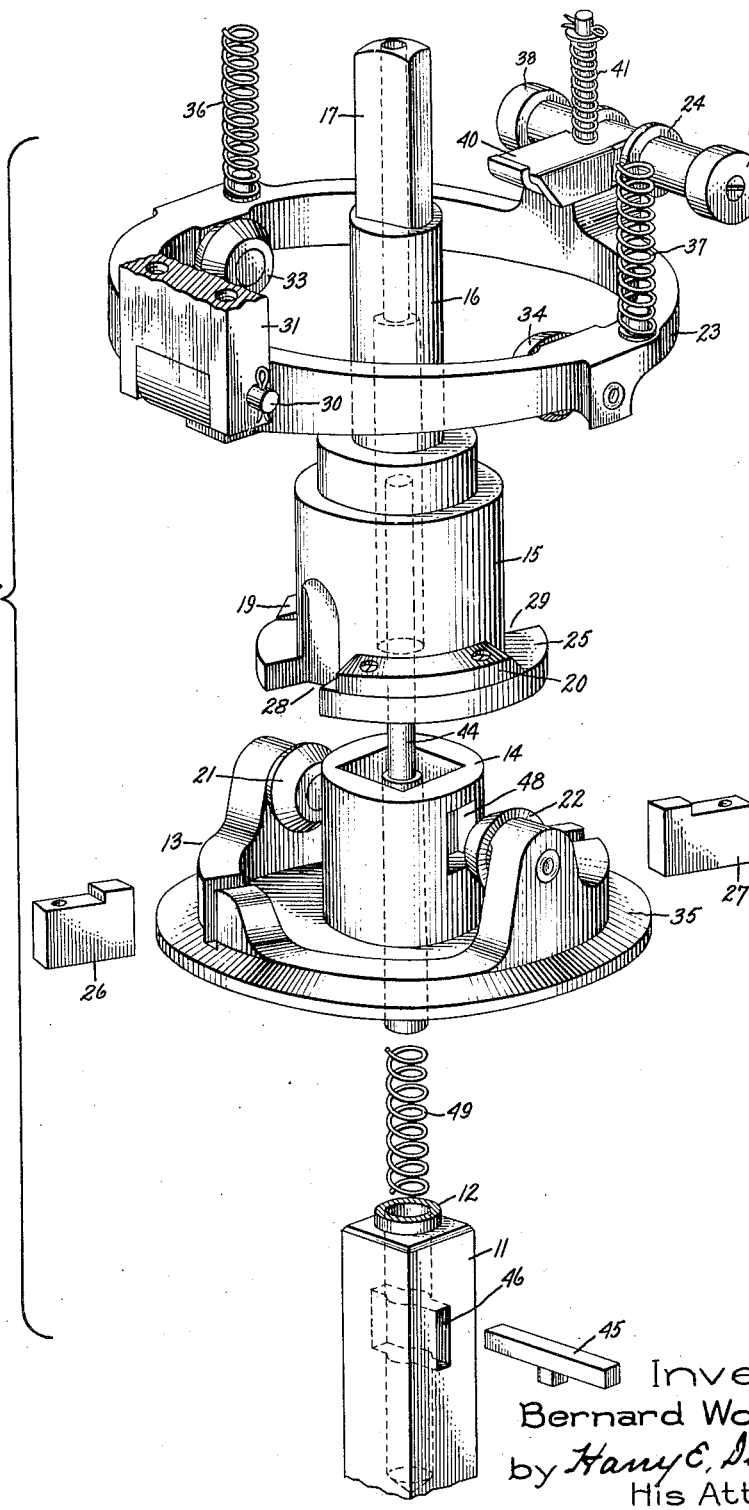

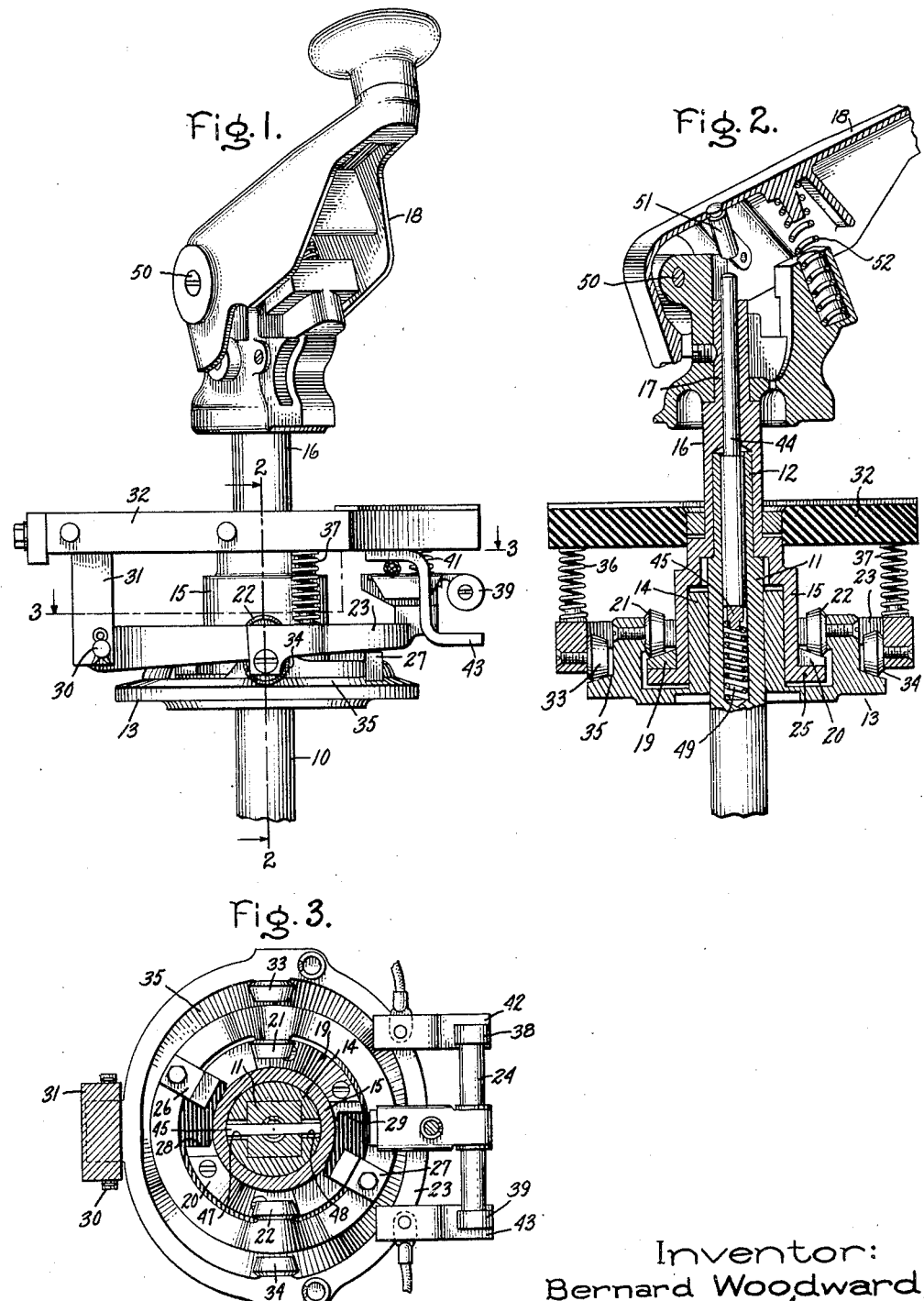

Patented Apr. 23, 1940

2,198,469

UNITED STATES PATENT OFFICE 2,198,469

CONTROLLER

Bernard Woodward, Erie, Pa., assignor to General Electric Company, a corporation of New York Application May 18, 1939, Serial No. 274,378

6 Claims. (Cl. 200—59)

My invention relates to controllers for electric circuits and has for its object the provision of simple and reliable lost motion operating mechanism for operating an auxiliary switch when the controller is moved back toward the off position and thereby operating suitable switching or contactor means to open the controlled circuit before the controller contacts are opened.

My invention is especially useful in controllers for controlling the motors on electric railway or other vehicles, and the like.

In carrying out my invention in one form, I utilize a circuit controlling device having a rotary contact or switch operating member. I provide an annular or disk-shaped member which is secured to the switch member for rotation therewith and an operating member mounted on the disk member and arranged for limited movement therewith. This operating member is provided with cams which cooperate with rollers on the disk member so as to raise and lower the disk member which, in turn, operates circuit controlling means for an electromagnetically operated contactor in the controlled circuit. I also provide means responsive to a depression of the operating handle for moving the disk member to close the control circuit when the handle is depressed but arranged to open the control circuit when the handle is released.

For a more complete understanding of my invention, reference should be had to the accompanying drawings, Fig. 1 of which is an elevation view of a controller for railway motors embodying my invention; Fig. 2 is a sectional view along the line 2—2 of Fig. 1; Fig. 3 is a sectional view along the line 3—3 of Fig. 1 while Fig 4 is an exploded view in perspective of the various operating parts.

Referring to the drawings, I have shown my invention in one form as applied to the manually operated rotatable controller shaft 10 of a rotary control member such as a drum controller. Preferably the shaft 10 carries a series of cams (not shown) for operating, selectively, stationary switches (not shown) in the motor or other circuit to be controlled. The upper end of the shaft 10 is provided with a square portion 11 and with a smaller round portion 12. An actuating disk or annular member 13 provided with a cylindrical hub 14 is placed over the square portion 11, the hub 14 having a square hole which loosely fits on the square portion 11 so that the disk 13 may be easily moved axially of the shaft 10, i. e., upward or downward as seen in the drawings. On the round portion of shaft 12 and fitting loosely over the hub 14 is placed an operating or driving member 15. This member 15 has a bore into which fits the shaft 12 a sufficient distance and with sufficient exactness to hold the shaft 10 and member 15 in axial alignment and to provide a radial bearing for the upper end of shaft 10. Also a shoulder at the bottom of portion 12 fits against a counterbored shoulder in part 15 and provides a thrust bearing to support driving member 15. Driving member 15 is fitted on shaft 12 in such manner that it may be rotated easily. The upper end portion 16 of the member 15 is finished as a journal or shaft to turn in a bearing supported by the cover or housing of the controller.

On its upper end the member 15 is provided with a smaller square portion 17 to which is secured an operating handle 18. When the handle 18 is turned so as to turn the member 15, the member 15 at first turns through a small angle relative to the disk 13 and thereby, by means of the cams 19 and 20 carried by it which move under rollers 21 and 22 carried by the disk 13, raises or lowers the disk 13 and raises and lowers an annular switch arm 23 carrying a bridging contact 24. This bridging contact 24, it will be understood, is in the actuating circuit of an electro-magnetically operated switch or contactor which closes or opens the circuit controlled by the controller shaft 10.

It will be observed that the cams 19 and 20 are arc-shaped portions secured to a flange 25 on the lower end of the member 15, the flange and cams extending under the rollers 21 and 22. The movement of the member 15 in a plane at right angles to the axis of shaft 10 and relative to the disk 13 is limited to a small angle, such as from 8 to 20 degrees, by means of stops 26 and 27 secured to the disk 13 and projecting into diametrically opposite notches 28 and 29 in the flange 25. The notches 28 and 29 are, furthermore, each somewhat wider than the diameters of the rollers 21 and 22 so that with the stops 26 and 27 removed from the disk, the member 15 may be put in place, the rollers passing through the slots and then turned angularly with respect to the disk so that the stops can be put in place on the disk and in their respective notches 28 and 29.

The annular switch arm 23 is pivotally mounted on a pivot pin 30 secured to a bracket 31 which, in turn, is attached to the lower side of a supporting member or frame-work 32 for the controller. This support 32 may, for example, form the top of a casing (not shown). The switch arm 23 is provided with diametrically opposite rollers 33 and 34 secured to its inner wall which normally rest on a peripheral flange 35 on the disk 13. In fact, the switch arm is biased downward about its pivot 30 so that the rollers engage the track by means of helical springs 36 and 37 the upper ends of which gear against the support 32.

The bridging member 24 is in the shape of a rod of electrical insulating material with cylindrical contact members 38 and 39 on its ends and connected together by an electrical conductor. It is secured at its middle to the annular contact arm by means of an arm 40 one end of the arm being secured to the bridging contact and a portion of the other end of the arm being forced against a flat surface on the annular part 23 by a spring 41. This arrangement is to give a wiping contact action, the spring 41 being compressed when the bridging member engages its stationary contacts 42 and 43. These stationary contacts are secured to the support 32 which is preferably made of electrically insulating material.

Another feature is the provision of a mechanical connection between the handle and the disk 13 whereby when the handle is depressed the disk is lowered to move the contact arm 23 to its closed circuit position and thereby operate the contactor (not shown) to its closed position to close the circuit to be controlled. This mechanism comprises a rod 44 which is loosely mounted in bores provided for it in the upper end of the shaft 10 and the upper end of the member 15. As shown in Fig. 2, the rod 44, when the handle is in its upper position, as shown in the drawings, projects from the upper end of the member 15. The rod 44 rests on a member 45 which extends crosswise of the rod and is mounted in a transverse slot 46 in the square portion of the shaft 10. The ends of the member 45 project from the slot 46 and extend into apertures 47 and 48 in the hub 14. This member 45 is biased upward against the upper wall of the slot 46 by means of a spring 49 which overpowers the springs 36 and 37. In this position the member 45 engages the upper walls of the slots 47 and 48 and holds the disk 13 in an elevated position as shown in Figs. 1 and 2 so as to hold the contact arm 23 in its open circuit position. When the handle is depressed about its pivot 50, however, a projection 51 carried by the handle engages the upper end of the rod 44 and moves it downward, the rod forcing the member 45 downward whereby the disk and the contact arm are forced downward by the springs 36 and 37 until the bridging contact 24 engages its stationary contacts and closes its circuit. The handle, still held depressed, now may be moved to rotate the shaft 10 to the desired controlling position. This movement of the handle will be in a clockwise direction as the operating member 15 is viewed in Fig. 4 and, consequently, the cams 19 and 20 are not moved under the rollers 21 and 22 because the member 15 engages the stops 26 and 27 before the cams reach the rollers.

Upon reverse rotation of the handle in a counterclockwise direction from an operating position back toward its off position, the cams 19 and 20 engage and move under the rollers 21 and 22 before the stop is engaged and, consequently, the disk 13 is raised and the bridging contact 24 moved to its open position to interrupt the controlled circuit before the contacts operated by the shaft 10 are opened. It will be observed that the cams 19 and 20 have steep operating surfaces, i. e., the inclined ends of the cams adjacent the rollers 21 and 22 as seen in Fig. 3, whereby the bridging contact 24 is moved to its open position before the handle has moved through the remaining part of its lost motion travel. This gives an increased time for the line circuit breaker controlled by the contact 24 to open before the controller itself is moved far enough to open the motor circuit.

If at any time the handle is released, it is moved upward about its pivot 50 by the spring 52 whereupon the spring 49 forces the transverse member 45 upward raising the disk 13 and thereby moving the contact arm 23 to its open circuit position.

This arrangement is especially applicable to sealed or explosion proof controllers such as are used in gaseous atmospheres, for example, on mine locomotives. Thus the shaft 16 may be provided with a tight bearing on the cover 32 and the rod 44 with its long bore in the member 17 provides a tight joint so that the flames of burning gases cannot be propagated through openings in the controller and ignite surrounding explosive mixtures.

The two pairs of rollers, 21, 22, and 33, 34, are tapered as shown for the purpose of stabilizing and centralizing the members to which they are secured in a lateral direction with respect to the axis of the shaft 10. Also, of course, tapered rollers running on angular tracks develop less sliding friction than cylindrical rollers and, therefore, move more freely than cylindrical rollers.

While I have shown a particular embodiment of my invention, it will be understood, of course, that I do not wish to be limited thereto, since many modifications may be made and I, therefore aim in the appended claims to cover any such modifications as fall within the true spirit and scope of my invention.

What I claim as new and desire to secure by Letters Patent of the United States, is:

1. A controller comprising a rotary circuit controlling member having a non-circular portion, an annular member having a hub fitting on said non-circular portion so that said annular member is connected to said controlling member for rotation therewith, a driving member fitting over said hub and provided with a cam, a roller on said annular member engaging said cam, whereby said annular member is moved axially by said controlling member upon movement of said driving member with respect to said annular member, means limiting the angular movement of said driving member with relation to said annular member, and switching means operated by said annular member.

2. A controller comprising a rotary circuit controlling member having a non-circular end, a disk member having a hub fitting over said non-circular end so that said disk member is connected to said controlling member for rotation therewith, a driving member fitting over said hub and provided with a cam, a roller on said disk member engaging said cam, whereby said disk member is moved axially by said controlling member upon movement of said driving member with respect to said disk member, means limiting the angular movement of said driving member with relation to said disk member, a circular track on said disk member, and an annular switch arm provided with rollers bearing on said track.

3. A controller comprising a rotary circuit controlling member, an operating member mounted for rotation about the axis of said circuit controlling member, means limiting the rotation of said operating member with relation to said controlling member, a cam carried by said operating member, a third member cooperating with said cam and movable thereby longitudinally of said axis, switching means operated by said third member, said operating member being provided with a bore, a pin in said bore, a handle secured to said operating member for movement about a pivot substantially at right angles to said operating member into engagement with said pin, and means responsive to movement of said pin for operating said third member.

4. A controller comprising a rotary circuit controlling member, an operating member mounted for rotation about the axis of said circuit controlling member, means limiting the rotation of said operating member with relation to said controlling member, a cam carried by said operating member, a third member cooperating with said cam and movable thereby longitudinally of said axis, switching means operated by said third member, said operating member being provided with an axial bore, a pin in said bore projecting from said operating member, a handle secured to said operating member so as to be movable about a pivot at right angles to said operating member, a member operated by said pin cooperating with said third member, a spring biasing said member to move said third member to a predetermined position, and means carried by said handle for engaging said pin when said handle is moved about said pivot.

5. A controller comprising a rotary circuit controlling member, a disk member connected to said controlling member for rotation therewith, a driving member provided with a cam, means on said disk member engaging said cam, whereby said disk member is moved axially by said controlling member upon movement of said driving member with respect to said disk member, means limiting the angular movement of said driving member with relation to said disk member, switching means operated by said disk member, said driving member and said controlling member being provided with axial bores, a pin in said bores projecting from said driving member, a handle mounted on said driving member for movement about a pivot substantially at right angles to said controlling member into engagement with said pin, a spring biasing said pin toward said handle, and an operating connection between said pin and said disk member.

6. A controller comprising a rotary circuit controlling member having non-circular end, a disk member having a hub fitting over said non-circular end so that said disk member is secured to said controlling member for rotation therewith, a driving member fitting over said hub and provided with a cam, a roller on said disk member engaging said cam, whereby said disk member is moved axially by said controlling member upon movement of said driving member with respect to said disk member, means limiting the angular movement of said driving member with relation to said disk member, a circular track on said disk member, an annular switch arm provided with rollers bearing on said track, said driving member and said controlling member being provided with axial bores, a pin in said bores projecting from said driving member, a handle secured to said driving member, means mounting said handle for movement about a pivot at right angles to the axis of said controlling member, a cross member at the lower end of said pin extending through apertures provided for it in said controlling member and said hub, a spring biasing said cross member upward whereby said disc member is forced upward and means carried by the handle for engaging the upper end of said pin so as to depress said pin when the handle is depressed whereby said disk member is lowered to move said contact member to its closed circuit position.

BERNARD WOODWARD.